United States Patent [19]

Bymark et al.

[11] Patent Number: 5,407,978
[45] Date of Patent: Apr. 18, 1995

[54] RAPID CURING POWDER EPOXY COATING COMPOSITIONS HAVING INCREASED FLEXIBILITY, INCORPORATING MINOR AMOUNTS OF ALIPHATIC TRIEPOXIDES

[75] Inventors: Richard M. Bymark, Austin, Tex.; Allen L. Griggs, St. Paul, Minn.; James S. McHattie, Austin, Tex.; Taun L. McKenzie, St. Pual, Minn.

[73] Assignee: Minnesota Mining and Manufacturing Company, St. Paul, Minn.

[21] Appl. No.: 58,408

[22] Filed: May 7, 1993

[51] Int. Cl.$^6$ .................... C08G 59/14; C08L 63/00; C08F 283/00
[52] U.S. Cl. .................... 523/457; 523/458; 523/466; 525/523; 525/524; 525/526; 528/94; 528/103
[58] Field of Search .......... 525/526, 523, 524; 528/94, 103; 523/466, 457, 458

[56] References Cited

U.S. PATENT DOCUMENTS

| | | | |
|---|---|---|---|
| 3,240,376 | 3/1966 | Smith et al. | 528/103 |
| 3,445,429 | 5/1969 | Sellers | 528/103 |
| 3,931,109 | 6/1976 | Martin | 525/507 |
| 4,758,638 | 7/1988 | Hickner et al. | 525/510 |
| 5,095,050 | 3/1992 | Treybig et al. | 528/103 |
| 5,212,262 | 5/1993 | Anderson et al. | 525/524 |

FOREIGN PATENT DOCUMENTS

| | | | |
|---|---|---|---|
| 0325146 | 1/1989 | European Pat. Off. | C08G 59/06 |
| 75039691 | 12/1975 | Japan | C08G 52/42 |
| 1131284 | 5/1989 | Japan | C08G 59/62 |

OTHER PUBLICATIONS

SPE Journal, vol. 17, No. 6, "Two Flexible Epoxy Resins".

*Primary Examiner*—Frederick Krass
*Attorney, Agent, or Firm*—Gary L. Griswold; Walter N. Kirn; Darla P. Neaveill

[57] ABSTRACT

An advanced thermosetting epoxy powder composition comprising from about 95 epoxide equivalent percent to about 99 epoxide equivalent percent of a diglycidyl ether of an aromatic bisphenol, from about 1 to about 5 epoxide equivalent percent of at least one trifunctional polyglycidyl ether of an aliphatic polyol, a curing agent selected from the group consisting of dihydric bisphenol such as bisphenol-A and mixtures of bisphenol-A and bisphenol A endcapped diglycidyl ether of bisphenol A, and a curing accelerator selected from the group consisting of imidazoles and imidazole adducts with polyglycidyl ether of aliphatic polyol.

6 Claims, No Drawings

RAPID CURING POWDER EPOXY COATING COMPOSITIONS HAVING INCREASED FLEXIBILITY, INCORPORATING MINOR AMOUNTS OF ALIPHATIC TRIEPOXIDES

BACKGROUND OF THE INVENTION

1. Field of the Invention

The invention relates to advanced epoxy resin powders for coatings exhibiting superior stress/strain properties after curing to a thermoset condition, and having improved cure speed. These coating powders are useful in the protection of, e.g., steel reinforcing bar, metal coil stock and other metallic substrates which may require cold working after being coated.

2. Description of the Art

Coatings used to protect metals against corrosion are required to meet several important criteria. They must be durable so as to avoid damage to the coated product during transportation or storage and they must not craze or crack or otherwise fail when subjected to bending or other forms of distortion. Epoxy coatings for metals are well known in the art. They possess excellent abrasion and impact resistance and can be formulated to aggressively adhere to cleaned metal surfaces. Further, they have been found to survive most of the exacting conditions for corrosion protection coatings. However, until recently, even these suffered from insufficient flexibility. This resulted in the need for on-site repair, of gaps or voids in the coating, following installation of protected metal structures. While it has been possible to improve cured epoxy coating flexibility, using combinations of aromatic and aliphatic epoxides, these benefits have been offset by reduction in the rate of cure.

Commonly used epoxy protective coatings may be prepared by reacting diglycidyl ethers of dihydric phenols with dihydric phenols and subsequently curing them with appropriate curing agents. Coatings of this type are suitably durable for the majority of applications; however, they are likely to fail if coated metal substrates, such as metal plate, reinforcing rod or pipes are subjected to bending or other forms of distortion. Failure occurs when the coatings crack and provide a channel of access by water or other contaminants which attack the underlying metal. One solution for such stress failure by cracking has been the addition of an aliphatic diepoxide to the diglycidyl ether of the dihydric phenol.

U.S. Pat. No. 4,758,638 discloses advanced epoxy resin compositions comprising a mixture of diepoxides and at least one compound having two hydroxyl groups per molecule. The diepoxide mixture comprises from 6% to less than 50% of an aliphatic diepoxide and from about 50% to about 94% of an aromatic diepoxide.

European patent application EP 0325146 discloses a powder epoxy coating composition for metal reinforcing bars. In this case an advanced epoxy resin comprises an aromatic based epoxy resin, an aliphatic based epoxy resin and a dihydric phenol. The relative amounts of aromatic and aliphatic epoxy resin are derived from diepoxides. In this mixture of diepoxides, from 70% to 95% of the epoxide groups are provided by the aromatic diepoxide and from 30% to 5% of the epoxide groups are provided by the aliphatic diepoxide. Comparison between these compositions and ones wherein the epoxy groups are provided exclusively by aromatic epoxides indicates that cured coatings of the latter are susceptible to disbonding and cracking, especially at low temperature. These references suggest that compositions containing less than 5% aliphatic epoxide and in excess of 95% aromatic epoxide would be unsuitable as cured corrosion protective coatings for metal substrates. It is taught that such compositions would have a high probability of failure by cracking because of reduced flexibility.

Surprisingly, the current inventors have discovered an advanced epoxy resin with reduced amounts of aliphatic epoxide which provides cured corrosion protection coatings exhibiting not only desired flexibility but an increased rate of cure, allowing application at higher coating speeds. This increases the efficiency and lowers the cost of the coating operation.

Other references to anticorrosive coatings disclose reactions between epoxy resins and trihydric and tetrahydric alcohols (JP 1131284). Epoxy resin compositions disclosed in JP 75039691 refer to epoxy resin compositions consisting of a polyglycidyl ether of an aliphatic polyol and one or more aliphatic or alicyclic polycarboxylic acids or anhydrides. The resulting compositions have rubber-like elasticity, excellent cold, heat and weather resistance and are recommended for outdoor use. However, these compositions are non-friable, making them unsuitable for powder coating applications. Further, hydroxy terminated oligomers are not disclosed for use as curing agents.

The present inventors have discovered that an advanced epoxy powder composition may be prepared which does not have the inflexibility of prior art compositions. The improved coating conforms, without cracking, to metal substrates which have been bent or otherwise distorted.

Surprisingly, concentrations of aliphatic epoxide may be lowered to a level where, based upon prior art teachings, undesirable embrittlement of the epoxy coating would be expected to occur. Thus, with epoxy coating compositions of the present invention, it is possible to improve the curing speed without loss of flexibility.

Compositions of the current invention, while containing both aromatic and aliphatic epoxides, exhibit more rapid curing than prior art compositions which also rely on a combination of aromatic and aliphatic epoxides.

With increasing curing speed it is possible to increase the rate of throughput on the coating line where epoxy powder is applied to heated metal substrates such as rod or pipe. This is also accompanied by an increase in the volume of powder applied. Conventional epoxy powders such as those described above, have a problem when the rate of powder application is increased. The increase in speed results in an overspray condition wherein ultra-fine strands of molten epoxy resin are ejected from the surface of the hot, curing, corrosion protection coating. Sometimes referred to as cobwebbing, this condition causes blockage within the coating apparatus which results in increased down-time. It is therefore necessary to formulate powder coatings for minimum overspray.

Coatings of the present invention are extremely effective in reducing the overspray problem of cobwebbing. They have been shown to outperform prior art compositions such as those disclosed by the above references.

SUMMARY OF THE INVENTION

Epoxy powders suitable for coating of the present invention comprise diglycidyl ethers of aromatic bisphenols and related hydroxy compounds which possess terminal hydroxy groups, at least one trifunctional polyglycidyl ether of an aliphatic polyol, a co-reactant selected from a co-advancement agent and a curing agent, an curing accelerator effective in producing the final thermoset resin, and where desired, suitable other adjuvants.

In contrast to previously disclosed compositions, containing aliphatic and aromatic diglycidyl ethers, the present invention uses 5 epoxide equivalent percent or less of polyglycidyl ether of an aliphatic polyol, and preferably less than 2% of an aliphatic diepoxide.

Specifically, advanced thermosetting epoxy powder compositions of the invention comprise:

a) from about 95 epoxide equivalent percent to about 99 epoxide equivalent percent of a diglycidyl ether of an aromatic bisphenol, b) from about 1 to about 5 epoxide equivalent percent, preferably 1 to 3 percent, of at least one trifunctional polyglycidyl ether of an aliphatic polyol, c) a co-reactant selected from the group consisting of dihydric bisphenol A and mixtures of bisphenol-A and bisphenol-A endcapped diglycidyl ether of bisphenol A, and d) a curing accelerator selected from the group consisting of imidazoles and imidazole adducts with glycidyl ethers of bisphenol A.

Preferred epoxy powder compositions of the invention comprise less than 2% aliphatic diepoxide.

All parts, ratios and percents herein are by weight unless specifically otherwise stated.

DETAILED DESCRIPTION OF THE INVENTION

Aromatic epoxides useful in compositions of the current invention include diglycidyl ethers of bisphenol A and bisphenol F and mixtures thereof. These epoxides provide at least about 95 epoxide equivalent percent based on total epoxide content.

Aliphatic epoxides of the present invention are polyglycidyl ethers of aliphatic polyols. They may be multi-functional but must contain at least 30% of molecules having at least three epoxy groups. Suitable aliphatic epoxides include polyoxyalkylene-extended polyols having an average epoxy equivalent weight above about 500. Commercially available aliphatic epoxides include Heloxy TM 84, available from Rhone Poulenc, which is described as an epoxidized polyoxypropylene-extended glycerin-based triol and is believed to have an average of about 2.4 epoxy groups per molecule.

Suitable co-reactants for the present invention include molecules which may be of extended chain length provided they possess at least two terminal hydroxy groups. Examples include dihydric bisphenol such as bisphenol-A and Dow DEH 87, which is believed to be a mixture of bisphenol A and bisphenol A endcapped diglycidyl ether of bisphenol A.

The compositions of the invention also contain a curing accelerator. Useful accelerators include imidazoles and imidazole adducts with glycidyl ethers of bisphenol A. Commercially available materials include Epon TM P101, available from Shell Chemical Co., HT261 from Ciba Geigy, and #31 from HULS.

Compositions of the invention may also contain minor amounts of conventional adjuvants such as dyes, colorants, pigments, fillers, leveling agents, and the like. The bisphenol A coreactant is preferably present in an amount of 1–50 parts by weight per 100 parts by weight epoxides a) and b); the imidazole curing accelerator in an amount of 1–5 parts by weight; and the fillers (most preferably silica) in an amount of 1–10 parts by weight.

In a typical composition the diepoxide of bisphenol A is combined with a polyglycidyl ether of an aliphatic polyol (Heloxy TM 84 from Rhone Poulenc). This mixture of epoxides, in the presence of bisphenol A co-reactant and a suitable curing accelerator produces a solid advanced epoxy material which may then be melt blended with additional co-reactants, advancement agents, curing accelerators and the like, and then ground to provide a thermosetting powdered epoxy coating resin. The resulting coating composition is applied to metal substrates using typical means of application such as fluidized bed and electrospray technique.

Enhancement of gelation and curing rate is achieved by pre-reacting the polyfunctional aliphatic epoxide with bisphenol A. Each of the glycidyl ether groups available on the aliphatic epoxide react with the attachment of additional chain-length which is terminated by aromatic hydroxy functionality. During the formation of advanced epoxy materials, the aromatic hydroxy functional aliphatic species function as a co-advancement agent in the presence of epoxide functionality. Thus it is possible, by the use of a small amount of aliphatic epoxide in compositions of the invention and use of a bisphenol A endcapping procedure to eliminate the cure retarding effect of the aliphatic epoxide. At the same time, the flexibility inherent with the polyfunctional aliphatic compound is retained.

Therefore, with epoxy coating compositions of the present invention, it is possible to improve the curing speed without loss of flexibility.

Further detail of compositions of this invention and their preparation is provided in the following non-limiting examples.

TEST METHODS

Application of Epoxy Powder to Substrate

An epoxy powder, prepared as described below, is sprayed on to pre-heated (218°–246° C.), grit-blasted steel test bars, 0.95 cm×2.5 cm×18.4 cm in size. The bars are dipped in a powder bed to form a coating 250 μm in thickness. After 20 seconds, the bars are quenched in water. They are then cooled to 0° C. by immersion in an ice-bath for 45 minutes.

Coated test bars are then bent 180° around a 25 mm pin over a period of three seconds. The test bars coated with the epoxy powder composition of the invention showed no evidence of failure.

Gel Time Measurement

A sample of powder coating is spread on a heated planar surface maintained at 204° C. Initially the powder sample melts and coalesces. Within a few seconds the molten resin begins to cure to a thermoset condition. The gel time is recorded at the point where a significant increase in viscosity is observed.

EXAMPLE 1

| Advanced Epoxy Resin Composition | |
|---|---|
| Part A | |
| Rhone-Poulenc Heloxy 84 | 63.07 parts |
| Shell BPA 157 | 36.86 parts |
| Ethyltriphenylphosphonium Iodide | 0.07 parts |
| Part B | |
| Shell Epon TM 828 | 61.74 parts |

| Advanced Epoxy Resin Composition | |
| --- | --- |
| Shell BPA 157 | 26.57 parts |
| Part A | 10.98 parts |
| Ethyltriphenylphosphonium Iodide | 0.07 parts |
| CR-100 Flow Control Agent | 0.65 parts |

Part A—Bisphenol A Endcapped Aliphatic Epoxy Resin

In this example the aliphatic epoxide, triglycidyl ether of polyoxypropylene-extended glycerol, available as Heloxy ™ 84 from Rhone Poulenc, was first endcapped with bisphenol A according to the following procedure.

63.07 parts of Heloxy 84, 36.86 parts of bisphenol A, available as Shell BPA 157, 0.07 parts ethyl triphenyl phosphonium iodide were charged into a 1-liter split resin flask equipped with stirrer, vacuum pump and heating mantle. The mixture was continuously stirred under a reduced pressure of less than 30 mm Hg, and the temperature was raised using a Therm-o-Watch ™ (TOW) controller set at 80% output. At 145° C. a reaction occurred which caused a moderate exotherm. After the exotherm ceased, the temperature was reset to 165° C. with continuing moderate agitation for a further eighty minutes.

Thereafter, the vacuum was released and the contents of the flask were poured into an aluminum tray. Product from this first reaction was included in a second composition as follows.

Part B. Advanced Epoxy Composition 61.74 parts Shell Epon ™ 828 resin and 26.57 parts Shell BPA 157 bisphenol A were charged to a 1 liter split resin flask equipped with stirrer, vacuum pump and heating mantle. A Therm-o-Watch ™ (TOW) controller was used for the heating mantle. After evacuating the flask to a reduced pressure of less than 30 mm Hg, the flask and contents were heated to 110° C. with the controller setting of 80% TOW output. Stirring was continued until the bisphenol A was dissolved.

At this point the pressure inside the flask was raised to atmospheric pressure by addition of nitrogen gas. Next, 10.98 parts Part A material and 0.07 part ethyl triphenyl phosphonium iodide were charged to the resin flask, followed by reducing the pressure to less than 30 mm Hg for a second time. With a TOW output setting of 80%, the flask and contents were stirred while heating to 145° C. at which point the reaction occurred accompanied by a vigorous exotherm.

When the exotherm ceased, the controller was reset to 185° C. and moderate agitation was continued for a further ninety minutes. The flask was then filled with air, 0.65 part CR-100 flow control agent was added and stirring continued for thirty minutes at a controlled temperature of 185° C. Following cooling, the resulting advanced epoxy composition was poured into an aluminum pan for cooling.

COMPARATIVE EXAMPLES C1-C3

| Comparative Examples C1-C3 Composition Part A | | | |
| --- | --- | --- | --- |
| | Example C1 (parts) | Example C2 (parts) | Example C3 (parts) |
| Heloxy ™ 505 | 31.89 | | |
| DER 732 | | 35.93 | 3.50 |
| BPA 157 | 68.04 | 64.00 | 31.99 |
| EtPh$_3^+$ I$^-$ | 0.07 | 0.07 | 0.07 |
| Epon ™ 828 | | | 63.8 |

| Composition Part B | | |
| --- | --- | --- |
| | Example C1 (parts) | Example C2 (parts) |
| Shell Epon ™ 828 | 61.71 | 63.8 |
| Shell BPA 157 | 15.71 | 25.74 |
| Part A | 22.51 | 9.74 |
| EtPh$_3^+$ I$^-$ | 0.07 | 0.07 |
| CR-100 Flow Cont. | 0.65 | 0.65 |

Comparative Example C1

A powder coating was prepared according to Example 1. except that Heloxy ™ 505, epoxidized castor oil, was used in place of Heloxy ™ 84.

When subjected to the test procedure previously described, this composition failed badly. The coating showed an average of fifty (50) cracks per bar when coated at 218° C. and nine (9) cracks per bar when coated at 239° C.

Comparative Example C2

Using the same procedure as in Example 1, a powder coating was prepared wherein DER 732 (Epichlorohydrin—polyglycol available from The Dow Chemical Co.) replaced Heloxy ™ 84.

Comparative Example C3

Material for this example was prepared via a one step process rather than the two step process used in the previous examples.

Shell Epon ™ 828, Shell BPA 157 and Dow DER 732 were charged into a 1-liter split resin flask equipped with stirrer, vacuum pump and heating mantle with a Therm-o-Watch ™ (TOW) controller. After evacuating the flask to a reduced pressure of less than 30 mm Hg, the flask and contents were heated to 110° C. with the controller set at 80% TOW output. Stirring was continued until the BPA was dissolved at which point the pressure inside the flask was raised to atmospheric pressure by the addition of nitrogen gas. Ethyltriphenylphosphonium iodide was then charged into the resin flask, followed by reducing the pressure to less than 30 mm Hg. With a TOW output setting of 80%, the flask's contents were stirred while heating to 145° C. at which point a reaction was accompanied by a vigorous exotherm.

When the exotherm had ceased, the controller was reset to 185° C. and moderate agitation was continued for a further 90 minutes. Vacuum was then broken with air and Scotchflo ™ CR-100 flow control agent was added with continued stirring for 30 minutes at a controlled temperature of 185° C. The resulting composition was poured into an aluminum pan for cooling and solidification.

| Coating Powder Formulation | | | | | | | |
|---|---|---|---|---|---|---|---|
| Example | 1 | 2 | 3 | 4 | 5 | 6 | 7 |
| Advanced Resin | 86.9 | 86.5 | 87.7 | 87.3 | 85.8 | 84.0 | 88.9 |
| Dow DEH87 | 6.5 | 7.0 | 6.6 | 6.5 | 7.6 | 9.6 | 5.3 |
| EPON P101 | 4.5 | 4.5 | 4.1 | 4.5 | 4.5 | 4.4 | 3.6 |
| Chromium Trioxide | 0.7 | 0.7 | 0.7 | 0.7 | 0.7 | 0.7 | 0.7 |
| Titanium Dioxide | 1.4 | 1.4 | 1.4 | 1.4 | 1.4 | 1.3 | 1.4 |
| Cabosil | 0.2 | 0.2 | 0.2 | 0.2 | 0.2 | 0.2 | 0.2 |

| Example | 8 | 9 | 10 |
|---|---|---|---|
| Advanced Resin | 79.74 | 83.75 | 83.75 |
| Dow DEH87 | 15.95 | 10.05 | 10.05 |
| HT261 | 1.6 | 3.35 | |
| #31 | | | 3.35 |
| Chromium Trioxide | 0.64 | 0.67 | 0.67 |
| Titanium Dioxide | 1.28 | 1.34 | 1.34 |
| Modiflow III | 0.8 | 0.84 | 0.84 |
| Cabosil | 0.25 | 0.25 | 0.25 |

Coating Powder Preparation

The resulting solidified epoxy resin (86.9 parts) from Example 1 was melted onto a two-roll mill. One roll was maintained at approximately 10° C. while the other operated at approximately 65° C. DEH-87 curative (The Dow Chemical Company) was combined, at 6.5 parts, with 0.7 parts chromium trioxide and 1.4 parts titanium dioxide and blended for 5 minutes. Epon TM P101 imidazole co-advancement agent (Shell Chemical) at 4.5 parts was added and the mixture blended for another 5 minutes. The blend was cooled and hammer milled to a fine powder. Cab-o-sil TM M-5 fumed silica (Cabot Corp.) was added at 0.2 parts and then dispersed with 10 minutes of vigorous agitation on a paint shaker. Coarse particles were removed from the powder by sifting through a 70 mesh screen. The powder was then dried in a vacuum oven at room temperature for 2 days before application and testing.

Gel Time Comparison

The gel time of powder coating material made from the advanced resin of Example 1, was compared with similar coating material made with commercially available DER 6770, an advanced epoxy resin available from The Dow Chemical Company. The powder coating compositions are otherwise identical.

| Advanced Epoxy | Gel Time (Secs) |
|---|---|
| Example 1 | 6-7 |
| DER 6770 | 9-10 |

A three-second improvement in gel time is significant in providing gains in efficiency for production coating of steel substrates. Thus a faster gelling product provides productivity gains and cost reduction.

Other coating formulations (Examples 2–10 and C1–C3) were prepared according to the procedure in Example 1.

Material Testing

The powders, prepared as described above, were applied to grit-blasted steel test bars as described above. Coatings were rated on the basis of crack development, with zero cracks being desirable.

| Advanced Epoxy | Aliphatic Epoxide | Number of Cracks | Coating Temperature |
|---|---|---|---|
| Example 1A* | Heloxy 84 | Zero | 218° C. |
| Example 1B* | Heloxy 84 | Zero | 221° C. |
| | Heloxy 84 | zero | 232° C. |
| | Heloxy 84 | Zero | 246° C. |
| Example 2 | Heloxy 84 | Zero | 221° C. |
| Example 3 | Heloxy 84 | Zero | 281° C. |
| | Heloxy 84 | zero | 239° C. |
| Example 4 | Heloxy 84 | Zero | 218° C. |
| | Heloxy 84 | Zero | 239° C. |
| Example 5 | Heloxy 84 | Zero | 218° C. |
| | Heloxy 84 | Zero | 239° C. |
| Example 6 | Heloxy 84 | Zero | 218° C. |
| | Heloxy 84 | Zero | 239° C. |
| Example 7 | Heloxy 84 | Zero | 218° C. |
| | Heloxy 84 | Zero | 239° C. |
| Example 8 | Heloxy 84 | 0-2 | 246° C. |
| Example 9 | Heloxy 84 | Zero | 246° C. |
| Example 10 | Heloxy 84 | Zero | 246° C. |
| Example C1 | Heloxy 505 | 50 | 218° C. |
| | Heloxy 505 | 8-10 | 239° C. |
| Example C2 | DER 732 | Zero | 218° C. |
| | DER 732 | 0-1 | 239° C. |
| Example C3 | DER 732 (One Step) | Zero | 218° C. |
| | DER 732 | 0-1 | 239° C. |

*Examples 1A and B were prepared as duplicate batches according to the advanced epoxy resin preparation disclosed in Example 1 above.

Although almost no cracking was observed for Comparative Examples C2 and C3, some samples coated at a higher temperature did show signs of cracking. Samples of this invention, containing Heloxy 84 were the only ones to survive without evidence of cracking regardless of coating temperature.

What is claimed is:

1. A thermosetting epoxy powder composition comprising the product resulting from the advancement reaction of:
   a) from about 95 epoxide equivalent percent to about 99 epoxide equivalent percent of a diglycidyl ether of an aromatic bisphenol,
   b) from about 1 to about 5 epoxide equivalent percent of at least one trifunctional polyglycidyl ether of an aliphatic polyol,
   c) an effective amount of a co-reactant selected from the group consisting of bisphenol-A and mixtures of bisphenol-A and bisphenol-A endcapped diglycidyl ether of bisphenol A, and
   d) a curing accelerator selected from the group consisting of imidazoles and imidazole adducts with glycidyl ethers of bisphenol A.

2. A thermosetting epoxy powder composition according to claim 1 comprising from about 1 to about 3 epoxide equivalent percent of at least one trifunctional polyglycidyl ether of an aliphatic polyol.

3. A thermosetting epoxy powder composition according to claim 1 wherein said composition contains less than 2 epoxide equivalent percent of a difunctional polyglycidyl ether of an aliphatic polyol.

4. A thermosetting epoxy powder composition according to claim 1 comprising:
   a) from about 1 epoxide equivalent percent to about 5 epoxide equivalent percent of a triglycidyl ether of a polyoxypropylene polyol,
   b) from about 95 to about 99 epoxide equivalent percent of at least one diepoxide of bisphenol A,
   c) from about 1 part to about 50 parts by weight, based on 100 parts by weight a) and b), of a bisphenol A co-reactant selected from the group consisting of bisphenol A and mixtures of bisphenol-A and bisphenol-A endcapped diglycidyl ether of bisphenol A, d) from about 1 part to about 5 parts by weight, based on 100 parts by weight a) and b), of an imidazole curing accelerator, and e) from about 1 part to about 10 parts by weight, based on 100 parts by weight a) and b), of silica.

5. A thermosetting epoxy powder composition according to claim 1 further comprising a pigment.

6. A thermosetting epoxy powder composition according to claim 5 wherein the pigment is selected from $TiO_2$ or $Cr_2O_3$.

* * * * *

UNITED STATES PATENT AND TRADEMARK OFFICE
CERTIFICATE OF CORRECTION

PATENT NO.: 5,407,978

DATED: April 18, 1995

INVENTOR(S): Richard M. Bymark, Allen L. Griggs, James S. McHattie and Taun L. McKenzie It is certified that error appears in the above-identified patent and that said Letters Patent is hereby corrected as shown below:

On the title page, the residence of inventor Taun L. McKenzie should read -- North St. Paul, Minn. --.

Column 3, Line 3, "an curing accelerator" should read -- a curing accelerator --.

Column 6, Line 26, delete the "." before the word -- except --.

Column 8, Line 47, "bisphenol A," should read -- bisphenol A; --.

Column 9, Line 3, "bisphenol A," should read -- bisphenol A; --.

Signed and Sealed this

Twelfth Day of March, 1996

Attest:

BRUCE LEHMAN

Attesting Officer    Commissioner of Patents and Trademarks